United States Patent
Izaki (10) Patent No.: US 8,437,336 B2
(45) Date of Patent: May 7, 2013

(54) TELEPHONE DEVICE

(75) Inventor: Takeshi Izaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1028 days.

(21) Appl. No.: 12/398,389

(22) Filed: Mar. 5, 2009

(65) Prior Publication Data

US 2009/0225749 A1 Sep. 10, 2009

(30) Foreign Application Priority Data

Mar. 5, 2008 (JP) ................................. 2008-055185

(51) Int. Cl.
*H04L 12/66* (2006.01)
*H04M 11/00* (2006.01)
*H04M 7/00* (2006.01)

(52) U.S. Cl.
USPC .................... 370/352; 379/221.01; 379/90.01

(58) Field of Classification Search .................. 379/156, 379/157, 221.01, 90.01; 370/352
See application file for complete search history.

(56) References Cited

U.S. PATENT DOCUMENTS

| | | | | |
|---|---|---|---|---|
| 5,396,548 A * | 3/1995 | Bayerl et al. | ................... | 379/140 |
| 6,700,956 B2 * | 3/2004 | Chang et al. | ................ | 379/93.09 |
| 6,975,713 B1 * | 12/2005 | Smith et al. | .................... | 379/156 |
| 7,301,940 B1 * | 11/2007 | Bernstein | ...................... | 370/356 |
| 7,457,278 B2 * | 11/2008 | Son et al. | ....................... | 370/351 |
| 7,688,803 B1 * | 3/2010 | Young et al. | .................... | 370/352 |
| 2004/0151165 A1 | 8/2004 | Ezumi | | |
| 2004/0192292 A1 * | 9/2004 | Chang et al. | ............... | 455/426.1 |
| 2007/0167157 A1 * | 7/2007 | Hundal | ...................... | 455/426.1 |
| 2008/0316946 A1 * | 12/2008 | Capper et al. | ................. | 370/260 |
| 2009/0040951 A1 * | 2/2009 | Buckley | ....................... | 370/310 |

FOREIGN PATENT DOCUMENTS

| | | |
|---|---|---|
| EP | 0999683 | 5/2000 |
| JP | 2001-024813 | 1/2001 |
| JP | 2002171335 | 6/2002 |
| JP | 2004229132 | 8/2004 |
| WO | 03073714 | 9/2003 |

* cited by examiner

*Primary Examiner* — Duc Nguyen
*Assistant Examiner* — Sonia Gay
(74) *Attorney, Agent, or Firm* — Banner & Witcoff, Ltd.

(57) ABSTRACT

A telephone device may selectively communicate via a public telephone network and an IP telephone network. The device may be configured to identify, when a start operation is performed after a preparing operation being performed while the request notice is being executed, whether a destination of the preparing operation is public network destination or an IP network destination. Additionally, the device may identify whether the call request is a public network request or an IP network request. The device may be configured to send a call request to the public network destination when the call preparing operation destination is a public network destination and the call request is identified as an IP network call request. The device may be configured to send a call request to the IP network destination when the destination corresponding to the call preparing operation is identified as a destination in the IP network.

10 Claims, 5 Drawing Sheets

TELEPHONE DEVICE

CROSS-REFERENCE TO RELATED APPLICATION

This application claims priority to Japanese Patent Application No. 2008-055185, filed on Mar. 5, 2008, the contents of which are hereby incorporated by reference into the present application.

BACKGROUND OF THE INVENTION

1. Field of the Invention

The present invention relates to a telephone device that is configured to selectively communicate via both a public telephone network and an IP telephone network.

2. Description of the Related Art

EP0999683A2 discloses a telephone device that is configured to communicate via a public telephone network. Further, International Publication WO 03/073714 discloses a telephone device that is configured to communicate via an IP telephone network.

In either of the above telephone devices, the telephone device executes a call request notice (for example, outputs a ringing sound) upon receiving a call request. Consequently, the user knows that someone is placing a phone call to the user. The user is able to take the phone call by performing a call start operation (for example, setting the receiver to the off-hook state). Conversely, there may be occasions when the user wants to make a phone call while a call request notice is being executed. Upon placing a phone call, the user must perform a call start operation. As mentioned above, in the case of the conventional telephone device, when a call start operation is performed while a call request notice is being executed, the phone call is taken. For this reason, conventionally it is not possible to make a phone call while a call request notice is being executed.

SUMMARY OF THE INVENTION

This specification provides technology that enables a phone call to be placed while a call request notice is being executed.

Simply stated, equipping the telephone device with a function for canceling a call request that has been received (called the "received call request" hereinafter) enables the user to make a phone call even if a call request notice is being executed. For example, it may be possible to provide a function for enabling the user to cancel a received call request by performing a prescribed operation while the call request notice is being executed. However, in utilizing this function, the telephone call of the source of the received call request may be suddenly disconnected after the call-up sound on the source side has been started. This may not make a very good impression on the source of the received call request.

The inventors have endeavored to realize technology that would make it possible to make a phone call while a call request notice is being executed without canceling the received call request. To that end, there has to be a line for maintaining the received call request and another line for placing the phone call. To realize this, the inventors have conceived of using a telephone device that is able to selectively communicate via both the public telephone network and the IP telephone network. That is, the inventors have conceived of using a telephone device that would make it possible to receive a call request from whichever of the public telephone network and the IP telephone network, and, moreover, to make a phone call to a telephone device that may exist upon whichever of the public telephone network and the IP telephone network. According to this telephone device, it is possible to make a phone call via the IP telephone network while a call request notice is being executed in accordance with a call request from the public telephone network without canceling this call request. According to this telephone device, it is also possible to make a phone call via the public telephone network (or IP telephone network: in a case where it is possible to establish a plurality of telecommunication sessions via the IP telephone network) while a call request notice is being executed in accordance with a call request from the IP telephone network without canceling this call request. The technology disclosed by this specification has been created with this insight in mind, and may comprise the following configuration.

The telephone device disclosed in accordance with this specification may be configured to selectively communicate via both the public telephone network and the IP telephone network. The public telephone network, for example, may be a PSTN (Public Switched Telephone Network), an ISDN (Integrated Services Digital Network) or the like. This telephone device may comprise a call request receiving device, a call request notice device, an operating device, a call established status constructing device, a first identifying device, a second identifying device, a first call request sending device and a second call request sending device.

The call request receiving device may be configured to receive a call request. The call request notice device may be configured to execute a call request notice on a condition that the call request is received by the call request receiving device. Furthermore, it should be noted that the terminology "call request notice" shall be interpreted in its broadest sense, and is a concept comprising a variety of possible techniques for notifying a user that a call request has been received. For example, outputting a sound (ringing), vibrating, displaying a prescribed message, or changing the lighting pattern of a lamp may be referred to as examples of a "call request notice".

The operating device may be configured to allow a user to perform an operation. The call established status constructing device may be configured to construct a call established status with a source of the call request on a condition that a call start operation is performed on the operating device, without a call preparing operation being performed on the operating device while the call request notice is being executed by the call request notice device. Furthermore, it should be noted that the terminology "call preparing operation" shall mean an operation for the user to identify the telephone identification information of the other party. For example, inputting telephone identification information, inputting a so-called speed dial, and selecting one piece of telephone identification information from among a plurality of telephone identification information stored beforehand may be referred to as examples of a "call preparing operation". Further, "call start operation" shall mean an operation for taking a phone call. For example, raising the handset and setting the off-hook state by operating the hook key may be referred to as examples of a "call start operation". Furthermore, the call established status constructing device, for example, may construct the call established status by sending a response in reply to the call request. "A call established with a source of the call request" means "a call established status in which a telecommunication with a source of the call request is enabled".

The first identifying device may be configured to identify, on a condition that a call start operation is performed on the operating device after a call preparing operation is performed on the operating device while the call request notice is being executed by the call request notice device, whether a destination corresponding to the call preparing operation is a destination in the public telephone network or a destination in the IP telephone network. The second identifying device may be configured to identify whether the call request received by the call request receiving device is a call request via the public telephone network or a call request via the IP telephone network. The first call request sending device may be configured to send a call request to the destination in the public telephone network on a condition that the destination corresponding to the call preparing operation is identified as a destination in the public telephone network by the first identifying device and the call request received by the call request receiving device is identified as a call request via the IP telephone network by the second identifying device. The second call request sending device may be configured to send a call request to the destination in the IP telephone network on a condition that the destination corresponding to the call preparing operation is identified as a destination in the IP telephone network by the first identifying device. Furthermore, in a case where only one telecommunication session can be established via the IP telephone network, the second call request sending device may not send the call request on a condition that the destination corresponding to the call preparing operation is identified as a destination in the IP telephone network by the first identifying device and the call request received by the call request receiving device is identified as a call request via the IP telephone network by the second identifying device. That is, the second call request sending device may be send the call request on a condition that the destination corresponding to the call preparing operation is identified as a destination in the IP telephone network by the first identifying device and the call request received by the call request receiving device is identified as a call request via the public telephone network by the second identifying device. This configuration is included in the expression that states "the second call request sending device sends a call request to the destination in the IP telephone network on a condition that the destination corresponding to the call preparing operation is identified as a destination in the IP telephone network by the first identifying device."

According to the above-mentioned telephone device, a call established status is constructed (that is, the user takes the phone call) in a case where a call start operation is performed without a call preparing operation being performed while the call request notice is being executed. On the other hand, in a case where a call preparing operation is performed first and a call start operation is performed thereafter while a call request notice is being executed, an operation for placing a phone call is performed without taking the incoming phone call. As a result of this, it is possible to make a phone call while a call request notice is being executed. Since it is not necessary to cancel the received call request, a bad impression is not made on the source of the received call request. Specifically, it is possible to make a phone call via the IP telephone network while a call request notice corresponding to a call request via the public telephone network is being executed. It is also possible to make a phone call via the public telephone network while a call request notice corresponding to a call request via the IP telephone network is being executed. Which network is used to make the phone call will depend on the contents of the user-performed call preparing operation (that is, the network is determined on the basis of the telephone identification information). According to this configuration, the user is able to make a phone call via the intended network while a call request notice is being executed.

Furthermore, the above-mentioned telephone device is not limited as to whether a phone call can be made via the IP telephone network while a call request notice corresponding to a call request via the IP telephone network is being executed. For example, in a case where it is possible to parallelly establish a plurality of telecommunication sessions via the IP telephone network, a phone call via the IP telephone network can be made while a call request notice corresponding to a call request via the IP telephone network is being executed. Conversely, in a case where the device is only capable of establishing one telecommunication session via the IP telephone network, then a phone call cannot be made via the IP telephone network while a call request notice corresponding to a call request via the IP telephone network is being executed. The telephone device disclosed herein may be configured in either way as mentioned above.

DESCRIPTION OF THE PREFERRED EMBODIMENTS

Figure 1:
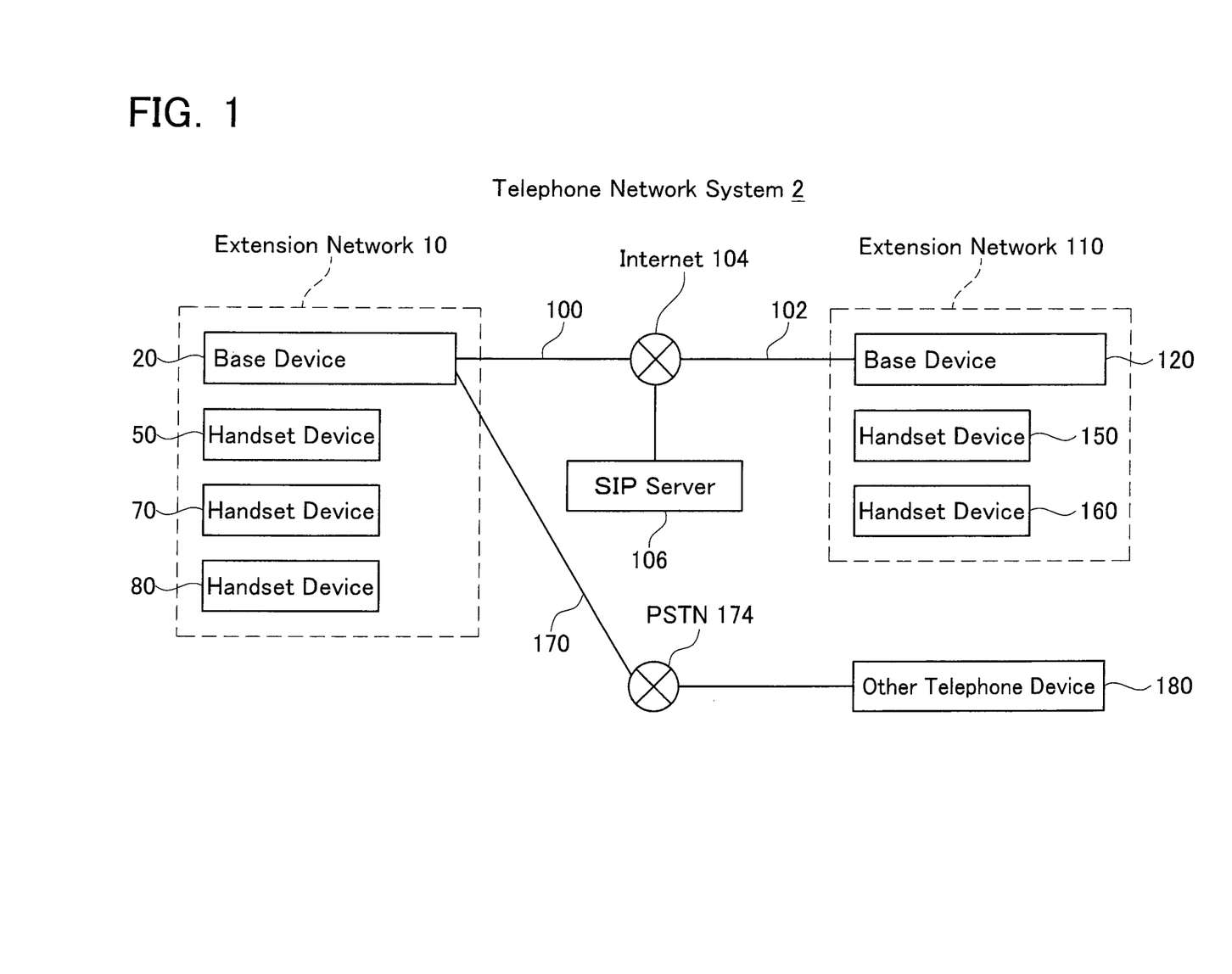
FIG. 1 shows a schematic example of the configuration of a telephone network system.

An embodiment of the technology disclosed herein will be explained by referring to the drawings. FIG. 1 shows a telephone network system 2 of this embodiment. The telephone network system 2 comprises a plurality of extension networks 10, 110, an Internet 104, a SIP server 106, a PSTN 174, and another telephone device 180. Furthermore, though only two extension networks 10, 110 are shown in FIG. 1, in actuality a large number of extension networks may exist. Further, though only one other telephone device 180 is shown in FIG. 1, in actuality a large number of other telephone devices may exist.

A plurality of SIP URI is assigned to the extension network 10. The extension network 10 comprises a base device 20 and a plurality of handset devices 50, 70, 80. The base device 20 is connected to the Internet 104 (the IP telephone network). The respective handset devices 50, 70, 80 configuring the extension network 10 are configured to carry out telephone communication via the Internet 104. That is, the extension network 10 is able to function as an IP telephone. One PSTN telephone number is also assigned to the extension network 10. The base device 20 is connected to the PSTN 174 (the public telephone network). The respective handset devices 50, 70, 80 configuring the extension network 10 are configured to carry out telephone communication via the PSTN 174. That is, the extension network 10 is also able to function as a telephone device using the public telephone device.

Likewise, a plurality of SIP URI is also assigned to the extension network 110. The extension network 110 comprises a base device 120 and a plurality of handset devices 150, 160. The base device 120 is connected to the Internet 104. The respective handset devices 150, 160 the configuring extension network 110 are configured to carry out a telephone communication via the Internet 104. In this embodiment, the extension network 110 only functions as an IP telephone and does not function as a telephone device using the public telephone device.

The SIP server 106 stores the SIP URI of the respective extension networks 10, 110 (that is, the telephone identification information of the respective extension networks 10, 110). The SIP server 106 is connected to the Internet 104. The SIP server 106 uses SIP to control telephone communications between the respective extension networks 10, 110. That is, for example, the respective commands that are communicated for a telephone communication between the extension network 10 and the extension network 110 are sent by way of the SIP server 106. Furthermore, in this embodiment, the other telephone device 180 is connected to the PSTN 174. In other words, the other telephone device 180 is a telephone device using the public telephone network.

(Base Device Configuration)

Figure 2:
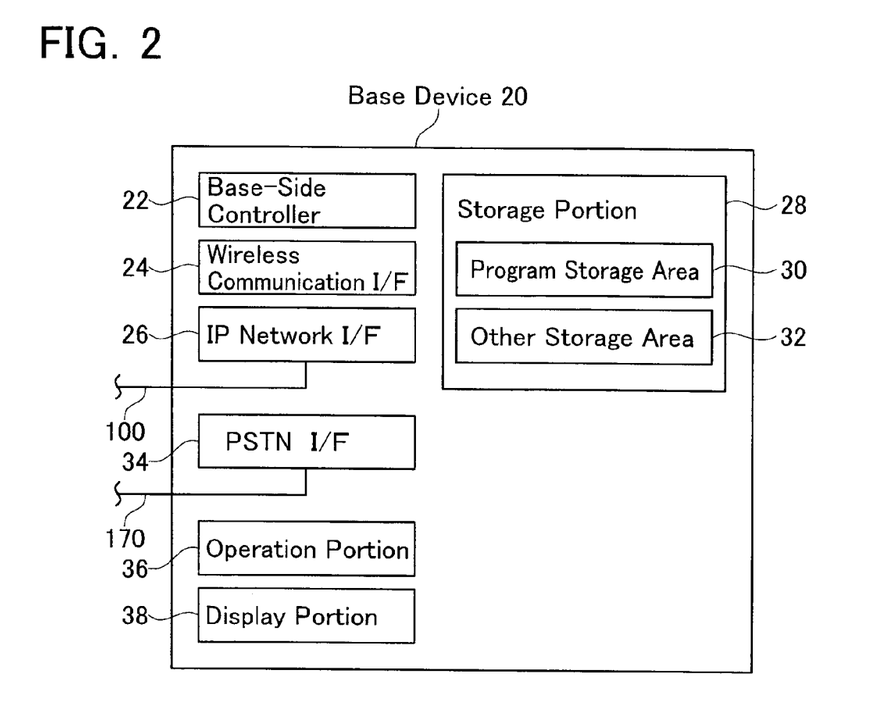
FIG. 2 shows a schematic example of the configuration of a base device.

The configuration of the base device 20 will be explained. The base device 20 comprehensively controls the respective handset devices 50, 70, 80. That is, the respective handset devices 50, 70, 80 are able to carry out telephone communications outside the extension network 10 via the base device 20. FIG. 2 shows the schematic configuration of the base device 20. The base device 20 has a base-side controller 22, a wireless communication interface 24, an IP network interface 26, a storage portion 28, a PSTN interface 34, an operation portion 36, and a display portion 38. The base-side controller 22 executes various processes in accordance with a program stored in the storage portion 28. The contents of the processes executed by the base-side controller 22 will be explained in detail below. The wireless communication interface 24 is for wireless communications with the respective handset devices 50, 70, 80. A LAN line 100 is connected to the IP network interface 26. The LAN line 100 is connected to the Internet 104. The base device 20 may access the Internet 104 via the IP network interface 26 and the LAN line 100. A PSTN line 170 is connected to the PSTN interface 34. The PSTN line 170 is connected to the PSTN 174. The base device 20 may carry out telephone communications via the PSTN 174 by way of the PSTN interface 34 and the PSTN line 170.

The storage portion 28 is configured from ROM, EEPROM, RAM and so forth. The storage portion 28 comprises a program storage area 30 and another storage area 32. The program storage area 30 stores programs to be executed by the base-side controller 22. For example, the program storage area 30 stores a program for carrying out telephone communications using SIP. The storage area 32 may store information other than the information that is to be stored in the program storage area 30. The operation portion 36 comprises a plurality of keys. The user may input various information into the base device 20 by operating the operation portion 36. The display portion 38 is able to display a variety of information thereon.

(Handset Device Configuration)

Figure 3:
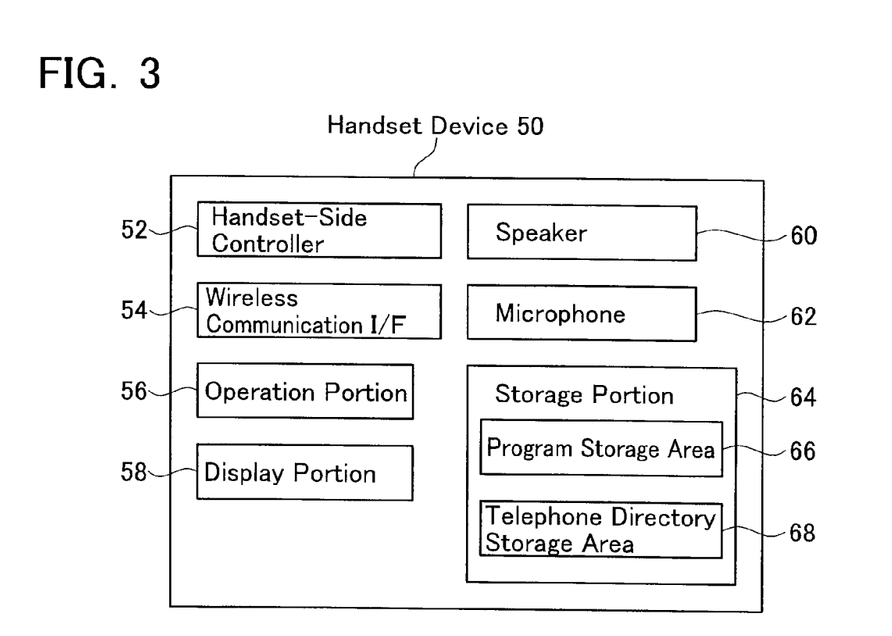
FIG. 3 shows a schematic example of the configuration of a handset device.

Next, the configuration of handset device 50 will be explained. Handset devices 70, 80 have the same configuration as handset device 50. For this reason, detailed explanations of handset devices 70, 80 will be omitted. The handset device 50 of this embodiment is a cordless type. FIG. 3 shows the configuration of the handset device 50. The handset device 50 comprises a handset-side controller 52, a wireless communication interface 54, an operation portion 56, a display portion 58, a speaker 60, a microphone 62, and a storage portion 64. The handset-side controller 52 executes various processes in accordance with a program stored in the storage portion 64. The contents of the processes executed by the handset-side controller 52 will be explained below as needed.

The wireless communication interface 54 is for wireless communications with the base device 20.

The operation portion 56 comprises a plurality of keys. For example, the operation portion 56 comprises a hook key and numeric key pads. The handset device 50 is in the on-hook state, which is a state in which the handset 50 is not in use. In a case of using the handset device 50 to make a phone call, the user may operate the hook key. Consequently, the handset device 50 transitions to the off-hook state. Next, the user inputs the telephone identification information (either the SIP URI or PSTN telephone number) of the call request destination into the handset device 50 by operating the numeric key pads (or by operating the speed dial function). The user is thereby able to make a phone call. Furthermore, the user is able to make a phone call even in cases where the user inputs the telephone identification information first and then sets the handset device 50 to the off-hook state by operating the hook key. Further, the user may set the handset device 50 to the off-hook state by operating the hook key while a phone call is being placed to the handset device 50 (i.e. during a call request notice). The user is thereby able to take a phone call. Hereinafter, setting the handset device 50 to the off-hook state to make a call, and setting the handset device 50 to the off-hook state to take a phone call shall be called the "call start operation".

The display portion 58 can display a variety of information. The user may make a phone call using the speaker 60 and the microphone 62. The storage portion 64 comprises a program storage area 66 and a telephone directory storage area 68. The program storage area 66 stores the program to be executed by the handset-side controller 52. The telephone directory storage area 68 is able to store a plurality of telephone identification information. The user is able to input telephone identification information and to store this telephone identification information in the telephone directory storage area 68 by operating the operation portion 56.

Furthermore, the base device 120 configuring the extension network 110 comprises the same configuration as the base device 20. However, the base device 120 differs from base device 20 in that base device 120 is not able to carry out telephone communications via the PSTN 174. The base device 120 can access the Internet 104 by way of a LAN line 102. Further, the handset devices 150, 160 configuring the extension network 110 comprise the same configuration as the handset device 50.

(Call Request Receiving Process)

Figure 4:
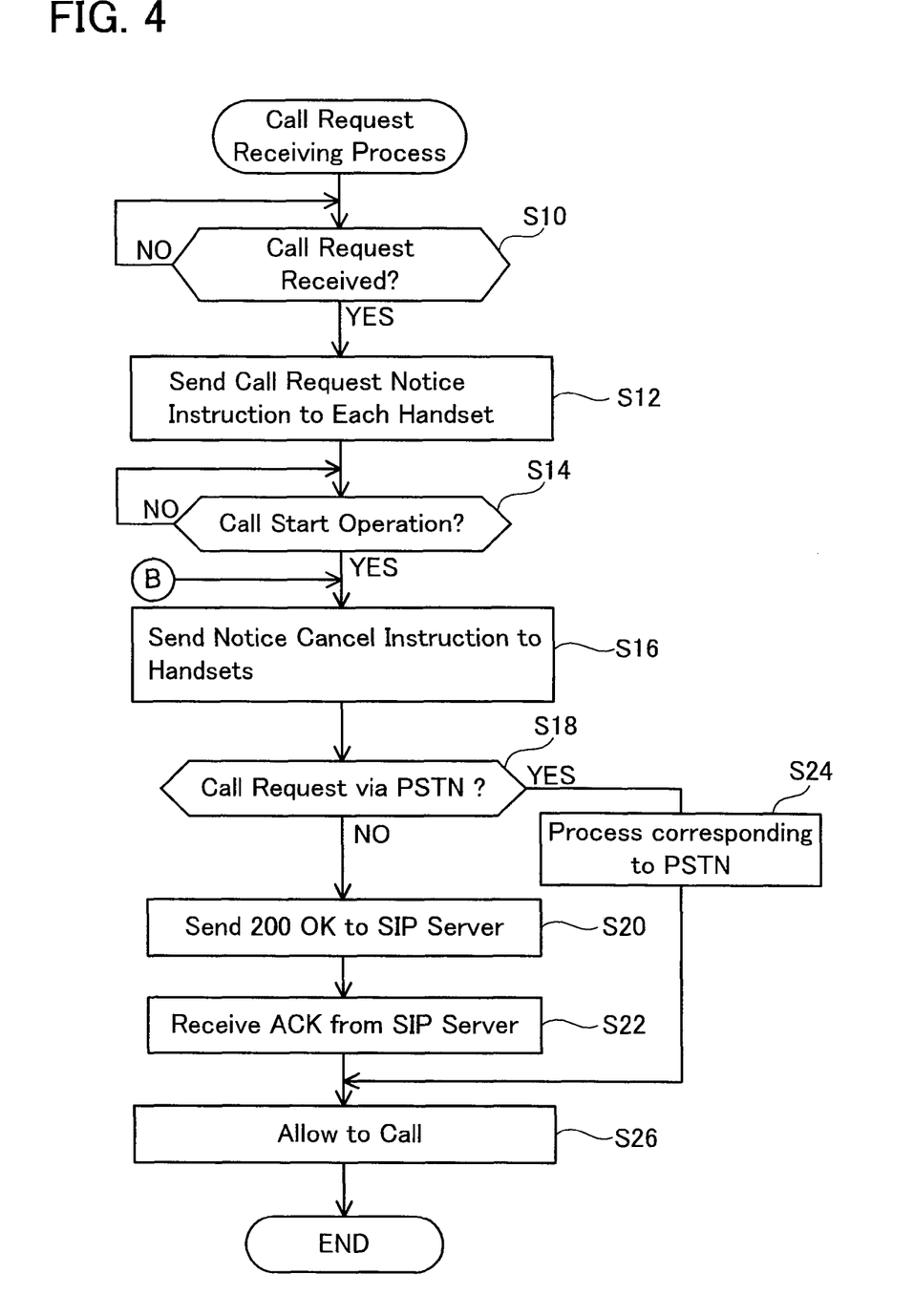
FIG. 4 shows a flowchart of a call request receiving process.

Next, the contents of the process executed by the base-side controller 22 will be explained. FIG. 4 shows a flowchart of the call request receiving process. The base-side controller 22 monitors to receive a call request (S10). For example, the user of the extension network 110 may make a phone call to the extension network 10 by inputting the SIP URI of extension network 10 into the handset device 150. In this case, a call request (an INVITE message) is sent to the SIP server 106 from the base device 120 of the extension network 110. This INVITE comprises the SIP URI of the extension network 110 as a source of the INVITE, and the SIP URI of the extension network 10 as a destination thereof. The SIP server 106, upon receiving the INVITE, transfers the INVITE to the extension network 10. The INVITE is received by the IP network interface 26. In accordance with this, the base-side controller 22 makes a determination of YES in S10. Further, the user of the other telephone device 180 may make a phone call to the extension network 10 by inputting the PSTN telephone number of the extension network 10 into the other telephone device 180. In this case, a call request is sent from the other telephone device 180 to the PSTN 174. Consequently, the call request is thereby received by the PSTN interface 34. In this case as well, the base-side controller 22 makes a determination of YES in S10.

In a case where the determination of YES is made in S10, the base-side controller 22 sends a call request notice instruction to each of the handset devices 50, 70, 80 (S 12). Each of the handset devices 50, 70, 80 (specifically, the handset-side controller 52 of the respective device), upon receiving the call request notice instruction, executes a call request notice. For example, each of the handset devices 50, 70, 80 outputs a ringing sound from the speaker 60. Furthermore, in this embodiment, the call request notice executed in accordance with the call request via the PSTN 174 is the same as the call request notice executed in accordance with the call request (INVITE) via the Internet 104. For this reason, the user is not able to identify the call request for which the call request notice is being executed. In a case where the call request notice is executed, the user knows that a phone call is being placed to each of the handset devices 50, 70, 80.

The base-side controller 22 monitors to execute a call start operation (that is, a hook key operation) in any handset device 50, 70, 80 that is the destination of the call request notice instruction (S14). The handset device, upon the hook key being operated during a call request notice, sends to the base device 20 information denoting that the call start operation has been performed thereon. The base-side controller 22 makes a determination of YES in S14 upon receiving this information in the base device 20 (via the wireless communication interface 24). Furthermore, this information includes the ID of the telephone device on which the call start operation was performed. Thus, the base-side controller 22 knows with which of the handset devices had the call start operation been performed.

In a case where the determination of YES is made in S14, the base-side controller 22 sends a notice cancel instruction to the handset devices other than the handset device via which the call start operation was performed in S14 (S16). For example, in a case where the call start operation is performed via handset device 50, the base-side controller 22 sends the notice cancel instruction to handset devices 70 and 80. Consequently, handset devices 70 and 80 cancel the call request notice (e.g. stops the ringing sound output).

Next, the base-side controller 22 determines whether or not the call request received in S10 was received via the PSTN interface 34 (S18). In a case where the call request received in S10 was received via the IP network interface 26 (that is, when an INVITE has been received), the base-side controller 22 makes a determination of NO in S18 and proceeds to S20. In S20, the base-side controller 22 sends a 200 OK as the response to the INVITE received in S10. Furthermore, in this embodiment, when the description reads "sends Y as the response to X", this signifies that Y comprises information specifying that Y is the response to X, information about the source of Y (i.e. the destination of X) and information about the destination of Y (i.e. the source of X). For example, when the description reads "sends a 200 OK as the response to INVITE", the 200 OK includes information specifying the 200 OK as the response to the INVITE, the SIP URI of the extension network 10 as the source of the 200 OK, and the SIP URI of the extension network (for example, extension network 110) as the destination of the 200 OK. The 200 OK is received by the SIP server 106. The SIP server 106 transfers the 200 OK to the source of the INVITE (for example, the extension network 110).

The source of the INVITE, upon receiving the 200 OK, sends an ACK. The ACK is received by the SIP server 106. The SIP server 106 transfers the ACK to the extension network 10, and the ACK is received by the base device 20 (S22). Consequently, an RTP (Real-time Transport Protocol) communication session for calling is established. Processing proceeds to S26 in a case where S22 ends.

On the other hand, in a case where the determination in S18 is YES, the base-side controller 22 executes a process corresponding to a call request via the PSTN 174 (S24). For example, the base-side controller 22 sends a response to the call request via the PSTN 174. A state in which calling via the PSTN 174 is enabled is thereby established. Processing proceeds to S26 in a case where S24 ends.

In S26, the base-side controller 22 allows calling by the handset device upon which the call start operation was performed in S14. Consequently, the handset device that had placed the call (either the source of the INVITE or the other telephone device) is able to establish the call with the handset device that the call start operation had been performed in S14.

(Call Request Sending Process)

Figure 5:
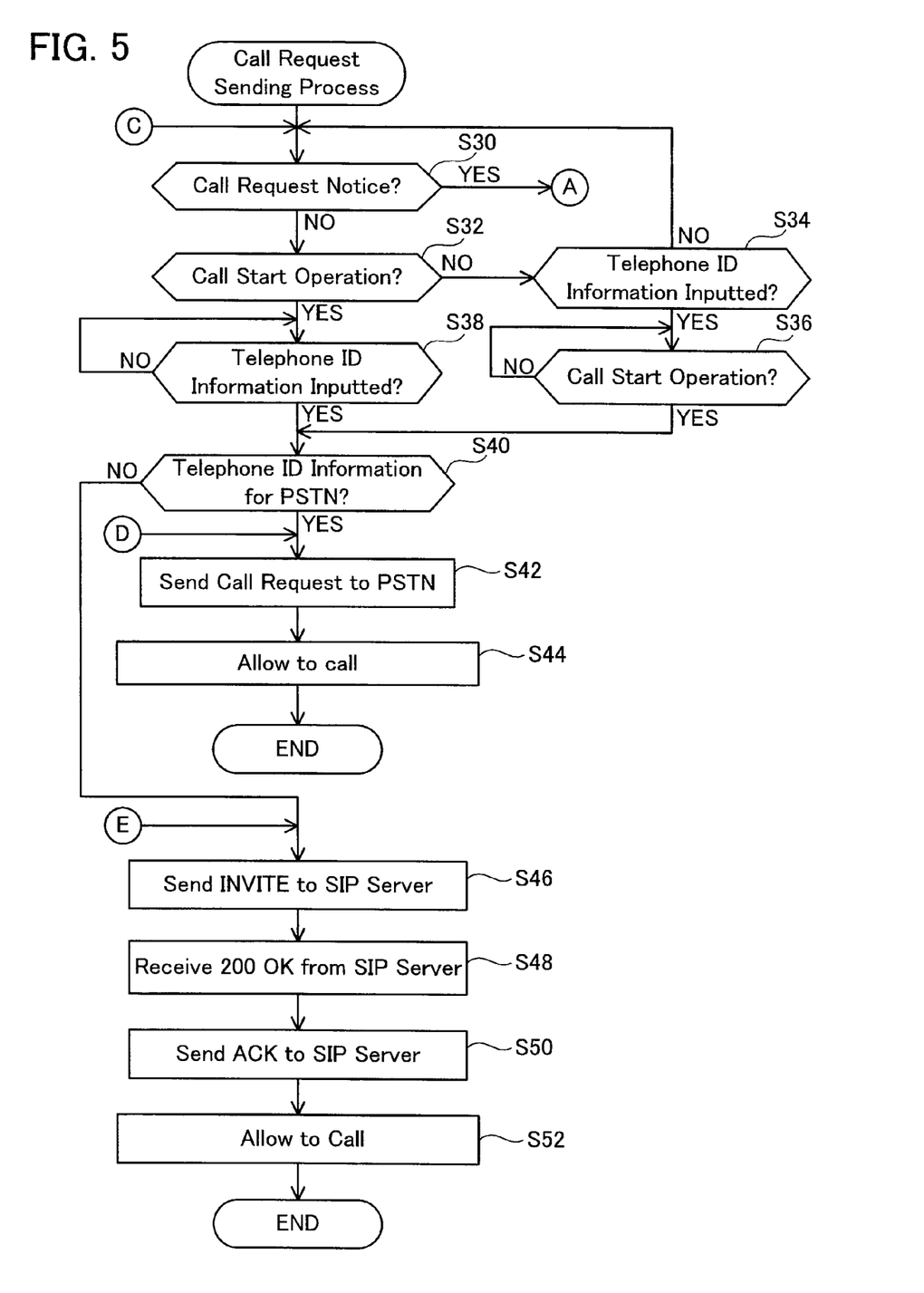
FIG. 5 shows a flowchart of a call request sending process.
Figure 6:
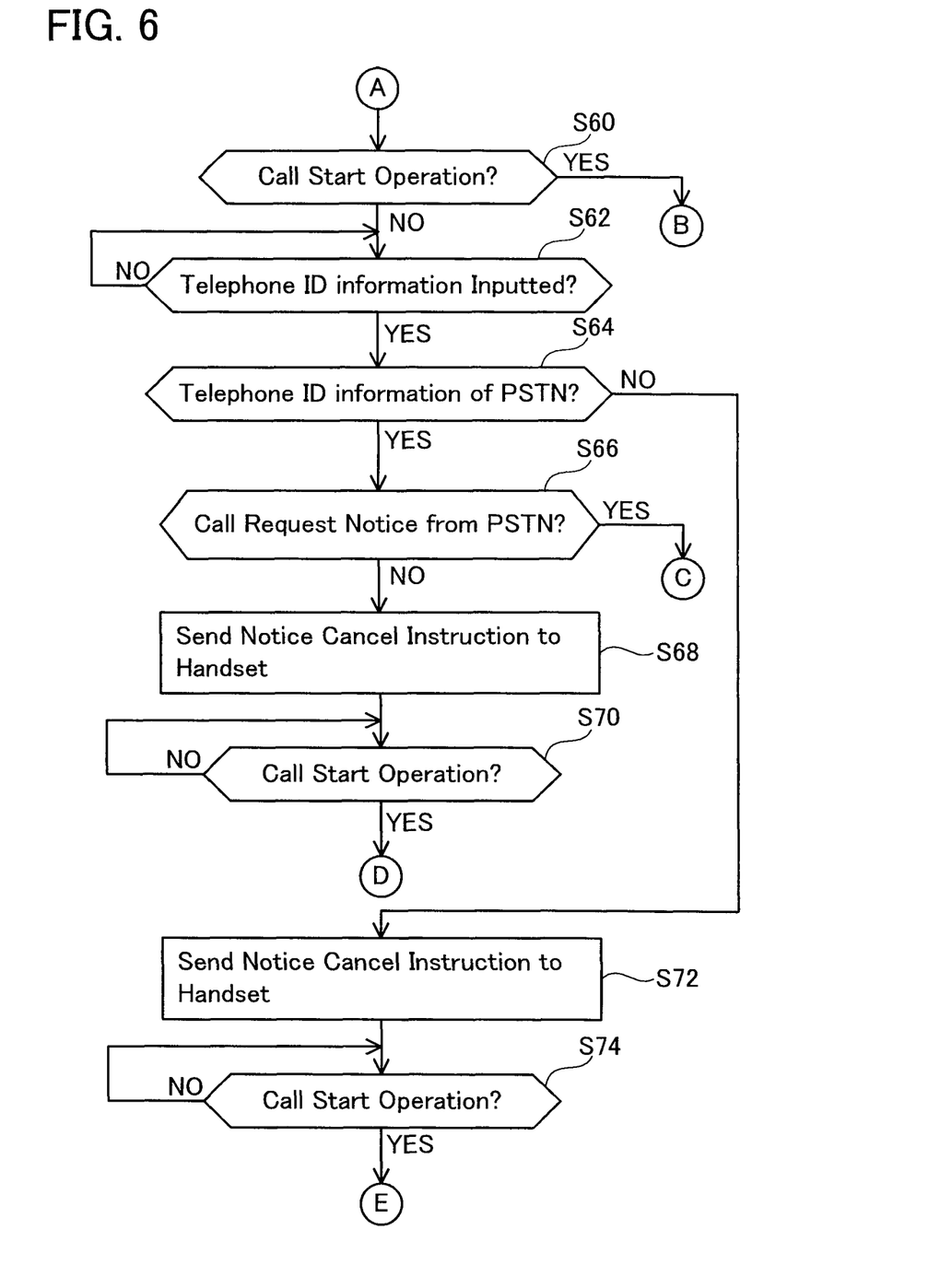
FIG. 6 shows a continuation of the flowchart of FIG. 5.

Next, the contents of the call request sending process will be explained. FIGS. 5 and 6 show a flowchart of the call request sending process. The base-side controller 22 monitors to execute a call request notice (S30). The time between S12 having been executed and S16 being executed in FIG. 4 is the time period during which the call request notice is being executed. In a case where the call request notice is not executed, the process of S32 and beyond is executed in accordance with the flowchart of FIG. 5. On the other hand, in a case where the call request notice is executed, the process of S60 and beyond is executed in accordance with the flowchart of FIG. 6.

In S32, the base-side controller 22 makes a determination as to whether or not a call start operation has been performed by any of the handset devices 50, 70, 80. For example, a user wishing to make a phone call may operate the hook key of any of the handset devices 50, 70, 80 (may set the handset device to the off-hook state). In this case, the handset device (specifically, the handset-side controller 52 of that device) sends to the base device 20 information denoting that a call start operation has been performed. In accordance with this, a determination of YES is made in S32.

On the other hand, a user wishing to place a phone call may input telephone identification information prior to operating the hook key. Furthermore, the user may input the telephone identification information by operating the numeric key pad, or the user may input the telephone identification information by selecting one piece of telephone identification information from among a plurality of telephone identification information stored in the telephone directory storage area 68. For example, a user wishing to place a phone call to the extension network 110 may input the SIP URI of the extension network 110 by operating the operation portion 56 of any handset device. The handset device (handset-side controller 52) sends this SIP URI to the base device 20. In accordance therewith, the base-side controller 22 makes a determination of YES in S34. Further, for example, a user wishing to place a phone call to the other telephone device 180 may input the PSTN telephone number of the other telephone device 180 by operating the operation portion 56 of any of the handset devices. The handset device (specifically, the handset-side controller 52) sends this PSTN telephone number to the base device 20. In this case as well, the base-side controller 22 makes a determination of YES in S34. Furthermore, in a case where the determination made in S34 is NO, the base-side controller 22 returns to the process of S30, and monitors to determine if a call request notice is executed, if a call start operation is performed or if telephone identification information is inputted.

In a case where the determination of YES is made in S32, the base-side controller 22 monitors for inputting of telephone identification information into the handset device by which the call start operation was performed in S32 (S38). The determination as to whether or not telephone identification information has been inputted is executed in the same manner as in the case of the above-mentioned S34. In a case where a determination of YES is made in S38, the process proceeds to S40. On the other hand, in a case where a determination of YES is made in S34, the base-side controller 22 monitors for a call start operation to be performed on the handset device that the telephone identification information had been inputted in S34 (S36). The determination as to whether or not the call start operation has been performed is made in the same manner as in the above-mentioned S32. In a case where the determination in S36 is YES, the process proceeds to S40.

In S40, the base-side controller 22 identifies whether the telephone identification information inputted in either S34 or S38 is telephone identification information for the PSTN 174 or telephone identification information (i.e. SIP URI) for the Internet 104. In a case where the telephone identification information is configured from numbers only, the base-side controller 22 identifies the telephone identification information as being telephone identification information to be directed to the PSTN 174. In this case, the process proceeds to S42. Conversely, in a case where the telephone identification information includes the alphabet, the base-side controller 22 identifies the telephone identification information as being telephone identification information to be directed to the Internet 104. The process moves to S46 in this case. Furthermore, the telephone directory storage area 68 may store identification information that corresponds to the telephone identification information for identifying whether this telephone identification information is telephone identification information for the PSTN 174, or telephone identification information for the Internet 104. In accordance therewith, in a case where the telephone identification information inputted in either S34 or S38 is read out from the telephone directory storage area 68, the base-side controller 22 may make a determination in S40 as to whether this telephone identification information is the telephone identification information for the PSTN 174 or the telephone identification information for the Internet 104, based on the identification information corresponding to the read-out telephone identification information.

In S42, the base-side controller 22 sends a call request that will be used in a PSTN telecommunication. This call request is sent by way of the PSTN 174 to a destination (for example, the other telephone device 180) corresponding to the telephone identification information inputted in either S34 or S38. In this example, the other telephone device 180 executes the call request notice. The user of the other telephone 180 may perform a call start operation. In accordance therewith, the base-side controller 22 allows calling in the handset device via which the call start operation was performed in either S32 or S36 (the handset device into which the telephone identification information was inputted in either S34 or S38) (S44). The handset device via which the call start operation was performed in either S32 or S36 is thereby able to establish the call with the handset device (for example, the other telephone device 180) corresponding to the telephone identification information inputted in either S34 or S38.

On the other hand, the base-side controller 22 sends an INVITE in S46. Furthermore, the further explanation below is given with the example in which the SIP URI of the extension network 110 is inputted in either S34 or S38 in this embodiment. The INVITE includes the SIP URI of the extension network 10 as the source, and the SIP URI of extension 110 as the destination. The INVITE is received by the SIP server 106. The SIP server 106 transfers the INVITE to the extension network 110. As a result, a call request notice is executed in the respective handset devices 150, 160 configuring the extension network 110. In a case where a call start operation is performed via either of the handset devices 150, 160, the base device 120 sends a 200 OK as the response to the INVITE. The 200 OK is received by the SIP server 106 and transferred to extension network 10. The 200 OK is received by the base device 20 (S48).

The base-side controller 22, upon receiving the 200 OK, sends an ACK (S50). The ACK is then received by the SIP server 106, and transferred to the extension network 110, thereby establishing an RTP communication session for calling. The base-side controller 22 allows calling in the handset device upon which the call start operation was performed in either S32 or S36 (i.e. the handset device in which the telephone identification information was inputted in either S34 or S38) (S52). The handset device in which the call start operation had been performed in either S32 or S36 is thereby able to establish the call with the handset device in the extension network 110 corresponding to the telephone identification information having been inputted in either S34 or S38 (in the handset device by which the call start operation had been performed).

Next, the process of S60 and beyond of FIG. 6 will be explained. At the stage when S60 is executed, a call request notice is executed by each of the handset devices 50, 70, 80. In S60, the base-side controller 22 determines whether or not a call start operation has been performed via any of the handset devices 50, 70, 80. In a case where the determination is YES in S60, the processes of S16 and beyond of FIG. 4 are executed. That is, a call start operation corresponding to the call request notice is performed, and various processes for starting a call are executed.

The user of the extension network 10 may input telephone identification information to any of the handset devices 50, 70, 80 even during the call request notice. The base-side controller 22 monitors the telephone identification information being inputted (S62). This process is the same as that of either S34 or S38 of FIG. 5. In a case where the determination made in S62 is YES, the base-side controller 22 identifies whether the telephone identification information inputted in S62 is telephone identification information directed to the PSTN 174 or telephone identification information (i.e. SIP URI) directed to the Internet 104 (S64). This process is the same as that of S40 of FIG. 5. In a case where the determination is YES in S64, the process proceeds to S66. Conversely, in a case where the determination made in S64 is NO, the process moves to S72.

In S66, the base-side controller 22 identifies whether the call request notice being executed corresponds to the call request via the PSTN 174, or whether the call request notice being executed corresponds to the call request (INVITE) via the Internet 104. In a case where the call request notice being executed corresponds to the call request via the PSTN 174 (a case in which the determination in S66 is YES), the telephone identification information inputted in S62 is invalidated. This is because telecommunication is being carried out in the extension network 10 using the PSTN 174 (the call request notice thereof is in progress), and it is impossible to make a phone call using the PSTN 174. In a case where the determination in S66 is YES, the process returns to S30.

Conversely, in a case where the call request notice being executed corresponds to the call request via the Internet 104

(a case in which the determination in S66 is NO), the base-side controller 22 sends a notice cancel instruction to the handset device into which the telephone identification information had been inputted in S62 (S68). The handset device into which the telephone identification information had been inputted in S62 thereby cancels the call request notice. Furthermore, the base-side controller 22 does not send a response (200 OK) to the call request even if a call start operation is performed on the handset device that had cancelled the call request notice (i.e. the phone call is not taken). The handset devices in which the call request notice is not executed are regarded as being in a waiting state that does not receive a call request. Next, the base-side controller 22 monitors the call start operation being performed in the handset device into which the telephone identification information had been inputted in S62 (S70). This process is the same as that of either S32 or S36 in FIG. 5. In a case where the determination in S70 is YES, the process moves to S42 of FIG. 5. As a result of this, it becomes possible for the handset device upon which the call start operation was performed in S70 to call the handset device corresponding to the telephone identification information having been inputted in S62 (for example, the other telephone device 180) via the PSTN 174 (cf. S44 of FIG. 5).

In S72, the base-side controller 22 sends the notice cancel instruction to the handset device into which the telephone identification information had been inputted in S62. The handset device into which the telephone identification information had been inputted in S62 thereby cancels the call request notice. Next, the base-side controller 22 monitors a call start operation being performed via the handset device into which the telephone identification information had been inputted in S62 (S74). This process is the same as that of either S32 or S36 of FIG. 5. In a case where the determination in S74 is YES, the process moves to S46 of FIG. 5. As a result of this, the handset device upon which the call start operation was performed in S74 is able to establish the call with the handset device corresponding to the telephone identification information inputted in S62 via the Internet 104 (cf. S52 of FIG. 5). Furthermore, the base device 120 of this embodiment may use the Internet 104 to parallelly establish a plurality of RTP communication sessions for calling. Therefore, a phone call may be placed using the Internet 104 while a call request notice corresponding to a call request (INVITE) via the Internet 104 is being executed. For this reason, the base-side controller 22 does not make a determination as to whether a call request notice corresponding to a call request (INVITE) via the Internet 104 is being executed, and consequently change the process in accordance with this determination result.

According to this embodiment, the call established status is constructed (i.e. the phone call is taken) in a case where the call start operation is performed without the call preparing operation (the inputting of telephone identification information) being performed while the call request notice of an incoming call is being executed. On the other hand, in a case where a call preparing operation is performed and successively the call start operation is performed while a call request notice is being executed, the call start operation does not function to take the incoming call, but instead functions to put through the call that had been input (dialed). As a result of this, it is possible to place a phone call while a call request notice is being executed. Because the received call request is not cancelled, the source of the aforementioned call request is not left with a bad impression. In this embodiment, it is possible to place a phone call using the Internet 104 while a call request notice corresponding to a call request via the PSTN 174 is being executed. It is also possible to place a phone call using the PSTN 174 while a call request notice corresponding to a call request via the Internet 104 is being executed. Further, it is possible to place a phone call using the Internet 104 while a call request notice corresponding to a call request via the Internet 104 is being executed. Whether the Internet 104 or the PSTN 174 is used to place a phone call in this embodiment depends on the contents of the user-performed call preparing operation (i.e. the determination is made based on the telephone identification information inputted by the user). According to this configuration, the user is able to place a phone call via the intended network even during the time in which the call request notice is being executed.

Further, according to this embodiment, in a case where it is possible to place a phone call while a call request notice is being executed, the call request notice is cancelled only for the handset device via which the call preparing operation has been performed. It is thereby possible to prevent the occurrence of a phenomenon in which the continuation of the call request notice interrupts the call. Moreover, the call request notice is continued in the other handset devices. Thus, another user is able to take the phone call corresponding to the call request notice.

Variations of the above-mentioned embodiment are given as examples below.

(1) In the above-mentioned embodiment, all the handset devices 50, 70, 80 configuring the extension network 10 are the cordless type. Alternately, a handset device that is connected to the base device 20 via a wire (shall be called a wired type handset device hereinafter) may also be added. The expression "the wired type handset device is executing a call request notice", for example, signifies that a ringing sound is being outputted from the speaker disposed in the base device 20. In order to realize this, the base-side controller 22 may send a call request notice instruction to a sound output circuit so that the above-mentioned sound may be outputted from the speaker disposed in the base device 20. In a case where these configurations are employed, the expression "the wired type handset device sends a call request notice instruction" signifies that the call request notice instruction will be sent to the above-mentioned sound output circuit. That is, the above-mentioned sound output circuit may be considered as one element configuring the wired type handset device.

(2) Further, in the above-mentioned embodiment, the call request notice that is executed corresponding to the call request via the PSTN 174 is the same as the call request notice that is executed corresponding to the call request (INVITE) via the Internet 104. However, different call request notices may be used. For example, the type of ringing sound may be changed.

(3) Further, in the above-mentioned embodiment, the extension network 10 can establish in parallel a plurality of RTP communication sessions for calling using the Internet 104. However, the extension network 10 may also be configured such that only one RTP communication session for calling is capable of being established. In this case, a determination as to whether or not the call request notice is being executed corresponding to the call request (INVITE) via the Internet 104 may be made subsequent to the determination of YES being made in S64 of FIG. 6. If a determination of NO is made here, the process of S72 may be executed. Furthermore, if a determination of YES is made here, the telephone identification information inputted in S62 may be invalidated, and the process may return to S30 of FIG. 5.

Some of the technology described in the above-mentioned embodiment will be disclosed below.

As described hereinabove, according to the above-mentioned telephone device, it is possible to place a phone call via the IP telephone network (or the public telephone network) while a call request notice corresponding to a call request via the public telephone network (or the IP telephone network) is being executed. However, it is not possible to place a phone call via the public telephone network in a case where a call request notice corresponding to a call request via the public telephone network is being executed. Therefore, the call request notice device may be configured to continue the call request notice on a condition that the destination corresponding to the call preparing operation is identified as the destination in the public telephone network by the first identifying device, and that the call request received by the call request receiving device is identified as a call request via the public telephone network by the second identifying device. Furthermore, as described hereinabove, in a case where only one communication session for calling can be established via the IP telephone network, it is not possible to place a phone call using the IP telephone network while a call request notice corresponding to a call request via the IP telephone network is being executed. The call request notice device may be configured to continue the above-mentioned call request notice in this case as well.

The telephone device may further comprise a notice cancel device configured to cancel the call request notice on a condition that the destination corresponding to the call preparing operation is identified as the destination in the public telephone network by the first identifying device and the call request received by the call request receiving device is identified as a call request via the IP telephone network by the second identifying device. The notice cancel device may cancel the above-mentioned call request notice on a condition that the destination corresponding to the call preparing operation is identified as a destination in the IP telephone network by the first identifying device. According to this configuration, a call request notice is cancelled in a case where placing a phone call while a call request notice is being executed. This makes it possible to prevent the occurrence of a phenomenon in which a call is interrupted by the continuation of the call request notice.

The telephone device may comprise a plurality of handset devices. In this case, each handset device may comprise the above-mentioned call request notice device and the above-mentioned operating device. The notice cancel device may be configured to selectively cancel a call request notice that the call preparing operation is performed using the operating device. According to this configuration, the call request notice will be continued for the handset devices via which the call preparing operation has not been performed. Another user (a user other than the user that performed the call preparing operation) may take the call corresponding to the call request notice.

Furthermore, the first identifying device may be configured to identify (1) the destination corresponding to the above-mentioned call preparing operation is a destination in the public telephone network in a case where only numbers are inputted in the above-mentioned call preparing operation, and (2) the destination corresponding to the above-mentioned call preparing operation is a destination in the IP telephone network in a case where Identification information used in the IP telephone network (for example, a URI) is inputted in the above-mentioned call preparing operation.

Further, the call request receiving device may comprise a first interface which is connected to the public telephone network, and a second interface which is connected to the IP telephone network. The second identifying device may be configured to identify that (1) a call request is a call request via the public telephone network in a case where the call request is received by the first interface, and (2) a call request is a call request via the IP telephone network in a case where the call request is received by the second interface.

The telephone device may utilize the SIP in a case where a telephone communication is carried out via the IP telephone network. The call request may be an INVITE command in this case.

The call preparing operation may be an operation for inputting the telephone identification information (either numbers such as a telephone number or identification information used in the IP telephone network such as a SIP URI) of the destination of the call request.

The telephone device may further comprise a telephone identification information storage device, which is configured to store a plurality of telephone identification information. In this case, the call preparing operation may be an operation for selecting one piece of telephone identification information from among the telephone identification information stored in the telephone identification information storage device.

The following telephone device may also be useful. This telephone device may be configured to communicate via the IP telephone network. This telephone device may comprise a call request receiving device, a call request notice device, an operating device, a call established status constructing device, and a call request sending device. The call request receiving device may be configured to receive a call request. The call request notice device may be configured to execute a call request notice on a condition that the call request is received by the call request receiving device. The operating device may be configured to allow the user to perform an operation. The call established status constructing device may be configured to construct a call established status with a source of the above-mentioned call request on a condition that a call start operation is performed on the operating device without a call preparing operation being performed on the operating device while a call request notice is being executed by the call request notice device. The call request sending device may be configured to send the call request to the destination in the IP telephone network corresponding to this call preparing operation on a condition that a call start operation is performed on the operating device after a call preparing operation is performed on the operating device while the call request notice is executed by the call request notice device.

What is claimed is:

1. A telephone device configured to selectively communicate via a public telephone network and an IP telephone network, the telephone device comprising:
a call request receiving device configured to receive a call request;
a call request notice device configured to execute a call request notice on a condition that the call request is received by the call request receiving device;
an operating device configured to allow a user to perform an operation;
a call established status constructing device configured to construct a call established status with a source of the call request on a condition that a call start operation is performed on the operating device without a call preparing operation being performed on the operating device while the call request notice is executed by the call request notice device;

a first identifying device configured to identify, on a condition that a call start operation is performed on the operating device after a call preparing operation being performed on the operating device while the call request notice is being executed by the call request notice device, whether a destination corresponding to the call preparing operation is a destination in the public telephone network or a destination in the IP telephone network;

a second identifying device configured to identify whether the call request received by the call request receiving device is a call request via the public telephone network or a call request via the IP telephone network;

a first call request sending device configured to send a call request to the destination in the public telephone network on a condition that the destination corresponding to the call preparing operation is identified as a destination in the public telephone network by the first identifying device and the call request received by the call request receiving device is identified as a call request via the IP telephone network by the second identifying device, and configured not to send a call request to the destination in the public telephone network on a condition that the destination corresponding to the call preparing operation is identified as a destination in the public telephone network by the first identifying device and the call request received by the call request receiving device is identified as a call request via the public telephone network by the second identifying device; and a second call request sending device configured to send a call request to the destination in the IP telephone network on a condition that the destination corresponding to the call preparing operation is identified as a destination in the IP telephone network by the first identifying device and the call request received by the call request receiving device is a call request via the public telephone network, wherein the second call request sending device is further configured to send a call request to the destination in the IP telephone network on a condition that the destination corresponding to the call preparing operation is identified as a destination in the IP telephone network by the first identifying device and the call request received by the call request receiving device is a call request via the IP telephone network.

2. The telephone device as in claim 1, wherein
the call request notice device is configured to continue the call request notice on a condition that the destination corresponding to the call preparing operation is identified as the destination in the public telephone network by the first identifying device and the call request received by the call request receiving device is identified as a call request via the public telephone network by the second identifying device.

3. The telephone device as in claim 1, further comprising:
a notice cancel device configured to cancel the call request notice upon one of the below conditions being satisfied:
(1) the destination corresponding to the call preparing operation is identified as a destination in the public telephone network by the first identifying device and the call request received by the call request receiving device is identified as a call request via the IP telephone network by the second identifying device; and (2) the destination corresponding to the call preparing operation is identified as a destination in the IP telephone network by the first identifying device.

4. The telephone device as in claim 3, comprising:
a plurality of receiver devices, wherein each of the plurality of receiver devices comprises the call request notice device and the operating device,
wherein the notice cancel device is configured to selectively cancel the call request notice for the receiver device that the call preparing operation is performed for using the operating device.

5. The telephone device as in claim 1, wherein
the first identifying device is configured to identify that:
(1) the destination corresponding to the call preparing operation is a destination in the public telephone network in a case where only numbers are inputted in the call preparing operation, and
(2) the destination corresponding to the call preparing operation is a destination in the IP telephone network in a case where identification information used in the IP telephone network is inputted in the call preparing operation.

6. The telephone device as in claim 1, wherein
the call request receiving device comprises a first interface connected to the public telephone network and a second interface connected to the IP telephone network, and
the second identifying device is configured to identify that:
(1) the call request is a call request via the public telephone network in a case where the call request is received by the first interface, and
(2) the call request is a call request via the IP telephone network in a case where the call request is received by the second interface.

7. The telephone device as in claim 1, further comprising:
a notice cancel device configured to cancel the call request notice on a condition that the destination corresponding to the call preparing operation is identified as a destination in the public telephone network by the first identifying device and the call request received by the call request receiving device is identified as a call request via the IP telephone network by the second identifying device.

8. The telephone device as in claim 7, comprising:
a plurality of receiver devices, wherein each of the plurality of receiver devices comprises the call request notice device and the operating device,
wherein the notice cancel device is configured to selectively cancel the call request notice for the receiver device that the call preparing operation is performed using the operating device.

9. The telephone device as in claim 1, further comprising:
a notice cancel device configured to cancel the call request notice on a condition that the destination corresponding to the call preparing operation is identified as a destination in the IP telephone network by the first identifying device.

10. The telephone device as in claim 9, comprising:
a plurality of receiver devices, wherein each of the plurality of receiver devices comprises the call request notice device and the operating device,
wherein the notice cancel device is configured to selectively cancel the call request notice for the receiver device that the call preparing operation is performed using the operating device.

* * * * *